United States Patent [19]
Sato et al.

[11] 3,745,572
[45] July 10, 1973

[54] METHOD OF PROTECTING PASSENGERS IN A MOVING VEHICLE UPON COLLISION THEREOF

[75] Inventors: Kazuo Sato; Tomio Hisatsune, both of Toyota, Japan

[73] Assignee: Toyota Jidosha Kogyo Kabushiki Kaisha, Toyota-shi, Aichi-ken, Japan

[22] Filed: Feb. 9, 1971

[21] Appl. No.: 113,897

[30] Foreign Application Priority Data
Feb. 19, 1970 Japan.................... 45/13817

[52] U.S. Cl. ............ 343/7 ED, 180/82, 343/8, 343/112 CA
[51] Int. Cl. .................................... G01s 9/44
[58] Field of Search.............. 343/112 CA, 7 ED; 180/82, 105, 106

[56] References Cited
UNITED STATES PATENTS
3,337,866  8/1967  Gisonno ..................... 343/7 ED
3,235,025  2/1966  Quinn ......................... 343/112 CA Primary Examiner—Benjamin A. Borchelt
Assistant Examiner—G. E. Montone
Attorney—Toren & McGeady

[57] ABSTRACT

Advance indication of an impending vehicle collision is accomplished by detecting the Doppler Shift imposed on a wave signal radiated from a vehicle. A passenger protecting device is actuated when the danger of collision is detected. The ultrashort wave signal obtained in a generator is radiated from antennas arranged in a horizontally spread pattern so as to form a semi-circular object detecting region. The wave signal reflected from an oncoming object is received at two or more points on the vehicle. Each of these reflected waves received at two points is separately mixed with the radiated wave and is subjected to homodyne detection by means of detectors to obtain the Doppler signals. After the Doppler signals are amplified, the quantities of electricity proportional to respective frequency of Doppler signal are obtained by means of frequency-voltage converters. The value of the ratio of these two quantities of electricity obtained by a divider is compared by a comparator. If this value is within a predetermined range, it indicates that two vehicles are in the crash region. The value of the sum of these two quantities obtained by an adder is compared in a blind zone circuit. When said value exceeds a certain value, it is determined that the relative velocity in the event of a crash is the critical velocity. Furthermore, the value of the sum obtained by an adder is compared in a blind zone circuit. When said value exceeds a certain value, the time allowance until a collision is determined. An actuating signal is issued from an "and" circuit only when said factors are all detected simultaneously, and an operation circuit actuates a passenger protecting device such air bag or the like.

18 Claims, 4 Drawing Figures

INVENTORS
KAZUO SATO
TOMIO HISATSUNE
BY Toren and McGeady
ATTORNEY

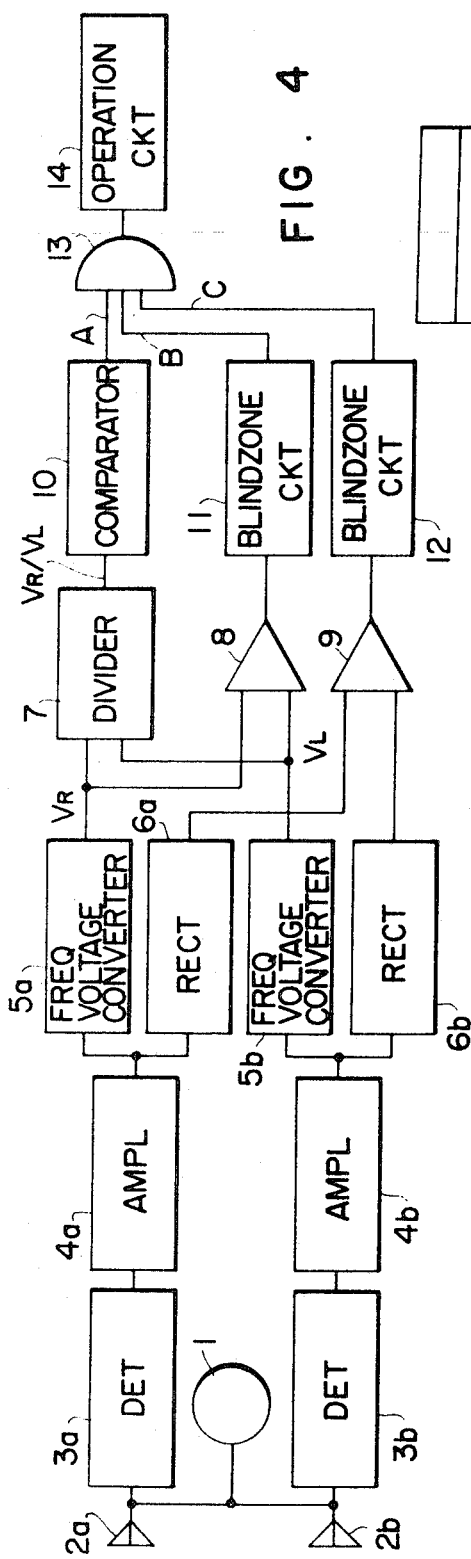
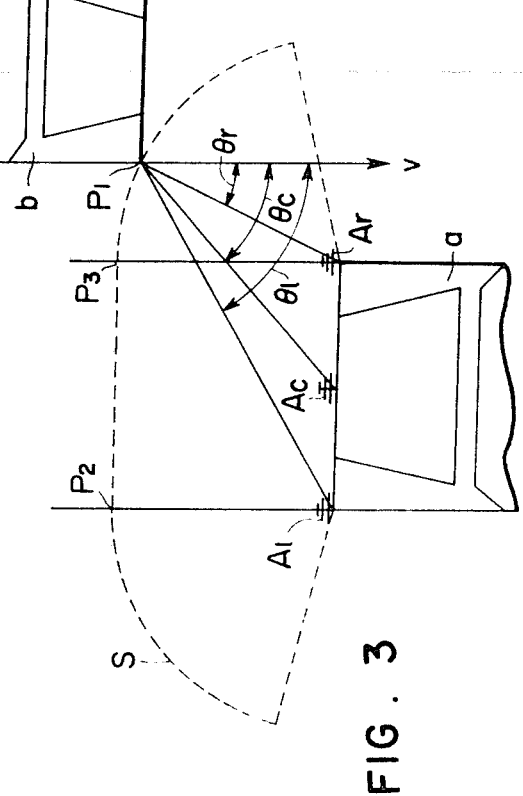
FIG. 4
FIG. 3

METHOD OF PROTECTING PASSENGERS IN A MOVING VEHICLE UPON COLLISION THEREOF

BACKGROUND OF THE INVENTION

This invention relates to a vehicle collision sensing system, and particularly to systems wherein the moving direction of an oncoming vehicle is predicted by detecting the frequency deviation, due to the Doppler effect, of radiated wave signals and a predetermined signal is issued to actuate a passenger protecting device when a on-coming vehicle is in the crash region.

Prior art passenger protecting system employs air bags installed in a vehicle at locations against which vehicle passengers are most likely to be thrown. Upon the occurrence of a crash, these air bags are rapidly inflated, thus protecting the life of passengers by the elasticity thereof. In this type of protecting device, an impact detecting unit for detecting the impact upon the occurrence of a crash is employed to actuate the protecting device. In actuating the protecting device, the operation of the protecting device must be completed in a very short period of time. If not, the inflation of air bags may be effected only after vehicle passengers are struck against a portion of the vehicle. In order to fulfil the above requirement, attempts have been made to utilize the explosion of gunpowder for the inflation of air bags. However, this method may inflict secondary injuries on passengers due to the rapid inflation of air bags.

The actuation of a protecting device such as air bags at a safe speed without incurring secondary injuries to passengers can be accomplished by detecting a vehicle collision well in advance and issuing a predetermined signal for actuating the protecting device. In order to fulfil the above requirement, a collision sensing system has been proposed wherein the relative velocity and relative distance between vehicles are determined by detecting the frequency deviation of the wave signal radiated from a vehicle due to the Doppler effect as well as signal level and the predetermined time allowance is taken to actuate the protecting device only when the relative velocity exceeds the critical velocity.

SUMMARY OF THE INVENTION

The object of this invention is to provide a vehicle collision sensing system capable of detecting whether or not two on-coming vehicles are in the crash region, thus eliminating unwanted operation of a protecting device and preventing a vehicle driver from losing control of the vehicle when two vehicles pass each other without colliding even if the relative velocity and the relative distance satisfy the predetermined conditions.

According to the vehicle collision sensing system of this invention, a wave signal radiated from a vehicle and reflected from an on-coming object is received at two points on the vehicle, which two points are separated in the horizontal direction with respect to the oncoming object to obtain two quantities of electricity proportional to the difference frequency between the frequencies of the reflected wave signals received at said two points and that of the radiated wave signal, thus detecting the relative position between the vehicle and the oncoming object from the ratio of said two quantities of electricity.

Moreover, according to this invention, a vehicle collision is detected in advance when said ratio of two quantities of electricity is in a predetermined range.

Furthermore, according to this invention, a vehicle collision is detected in advance when said ratio of two quantities of electricity is in a predetermined range and the sum of these two quantities exceeds a certain value.

Still furthermore, according to this invention, a vehicle collision is detected in advance when said ratio of two quantities of electricity is in a predetermined range and the sum of the levels of reflected wave signals received at two points exceeds a certain value.

BRIEF DESCRIPTION OF THE DRAWING

In the drawings:

FIGS. 1 through 3 are graphs illustrating the relative positions of two on-coming vehicles in order to facilitate the explanation of the vehicle collision sensing system according this invention; and FIG. 4 is a block diagram of an example of the device embodying the principles of the vehicle collision sensing system according to this invention.

DESCRIPTION OF A PREFERRED EMBODIMENT

Figure 1:
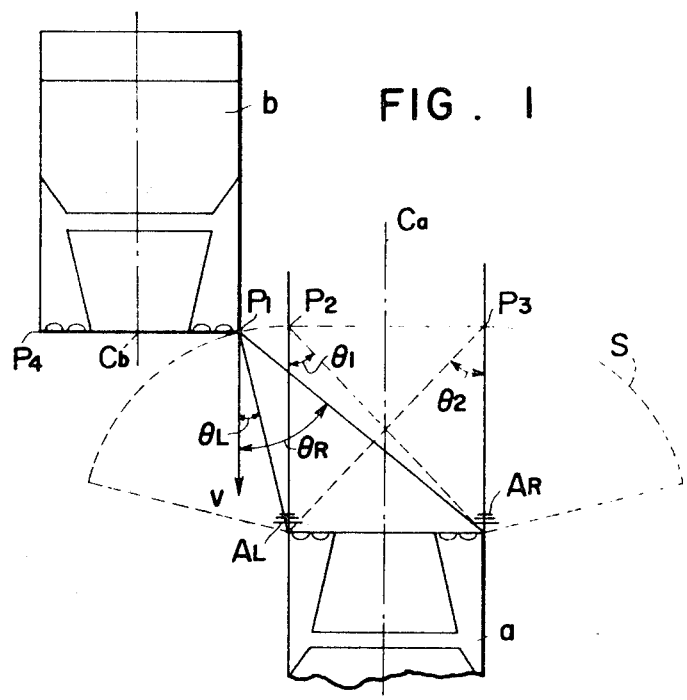

FIG. 1 illustrates the relative positions of two on-coming vehicles $a$ and $b$ moving parallel to each other. The vehicle $a$ has a collision sensing device mounted thereon and has antennas $A_L$ and $A_R$ installed, for example, in the front corners thereof. Wave signals such as a sound wave or an electric wave radiated from each antenna are reflected from various points on the on-coming vehicle and are received by the same antennas. The range S indicated in the dotted line is an object detecting region defined by the directivity of two antennas.

When two vehicles are approaching at the relative speed $v$ and a point on the oncoming vehicle $b$ enters the region S, the wave signal is reflected from this point toward each antenna. Experiments have shown that a greater portions of the reflected wave signal received by one antenna is reflected from the point on an oncoming object closest to the antenna, that is, the point $P_1$ in the illustrated case. This point is designated as the "equivalent reflection point." Angles $\theta_L$ and $\theta_R$ are formed by the lines connecting the equivalent reflection point $P_1$ and each antenna and the direction of the relative velocity $v$. Point $P_4$ indicates a point in the front corner of the on-coming vehicle $b$ on the side opposite the point $P_1$. The left and right sides of the vehicle $a$ intersect with the region S at respective points $P_1$ and $P_2$. Lines $C_a$ and $C_b$ indicate the center lines of the vehicles $a$ and $b$, respectively.

When wave signal having a frequency $f_t$ is radiated from a vehicle and an wave signal having a frequency $f_r$ is reflected from an oncoming vehicle, the following formula represents the relationship established between the relative velocity $v$ of both vehicles and the propagation velocity $c$ of the wave signal.

$$f_r \approx c + v/c - v \cdot f_t \qquad (1)$$

Let the difference frequency between the frequencies $f_t$ and $f_r$, i.e., the frequency of Doppler signal, be $f_d$. Then, $$f_d = f_r - f_t \approx 2vf/c \qquad (2)$$

If angles $\theta_L$ and $\theta_R$ exist between the direction of the relative velocity $v$ and the travelling directions of wave signals, as illustrated, the components of the relative velocity acting on the Doppler effect are expressed by $v \cos \theta_L$ and $v \cos \theta_R$. The frequencies $f_{dL}$ and $f_{dR}$ of the Doppler signals obtained by the antennas $A_L$ and $A_R$ are expressed as follows.

$$f_{dL} = 2vf_T/c \cos \theta_L \quad (3)$$

$$f_{dR} = 2vf_t/c \cos \theta_R \quad (4)$$

Let the quantities of electricity proportional to the frequencies $f_{dL}$ and $f_{dR}$ be $V_L$ and $V_R$, respectively. Then, the quotient of these quantities of electricity is $$V_R/V_L = \cos \theta_R / \cos \theta_L \quad (5)$$

The quotient $V_R/V_L$ is determined by the ratio of the cosines of the angles $\theta_L$ and $\theta_R$ formed by the directions of wave R/Vhd the antennas $A_L$ and $A_R$ and the direction of the relative velocity $v$.

Next, the relationship between the discrepancy of the center lines $C_a$ and $C_b$ of two vehicles $a$ and $b$ shown in FIG. 1 and the quotient $V_R/V_L$ will be examined. If two center lines $C_a$ and $C_b$ are on the same line, the angle $\theta_L$ is equal to the angle $\theta_R$. Consequently, $V_R/V_L = 1$. When the center line $C_b$ moves away from the center line $C_a$ in the direction of the point $P_2$, the angle $\theta_L$ becomes smaller than the angle $\theta_R$. Consequently, $V_R/V_L$ becomes smaller than 1 and the quotient decreases gradually. When the point $P_1$ coincides with the point $P_2$, the angle $\theta_L$ becomes equal to zero and $V_R/V_L$ becomes equal to $\cos \theta_1$. If the center line $C_b$ moves away from the center line $C_a$ in the direction of the point $P_3$, the angle $\theta_L$ becomes larger than $\theta_R$. Consequently, $V_R/V_L$ becomes larger than 1 and the quotient increases gradually. When the point $P_4$ coincides with the point $P_3$, the angle $\theta_R$ becomes equal to zero and $V_R/V_L$ becomes equal to $1/\cos \theta_2$.

When the quotient $V_R/V_L$ is larger than $\cos \theta_1$ but smaller than $1/\cos \theta_2$, the body of the on-coming vehicle $b$ is always situated between the point $P_2$ and the point $P_3$, and therefore a crash will occur. If the quotient $V_R/V_L$ is smaller than $\cos \theta_1$ or larger than $1/\cos \theta_2$, two vehicles $a$ and $b$ will not collide. According to this invention, as described above, occurrence of a collision is judged by detecting whether or not the quotient $V_R/V_L$ of two quantities of electricity $V_R$ and $V_L$ proportional to the frequencies of the Doppler signals obtained by two antennas $A_L$ and $A_R$ is in a certain range.

Figure 2:
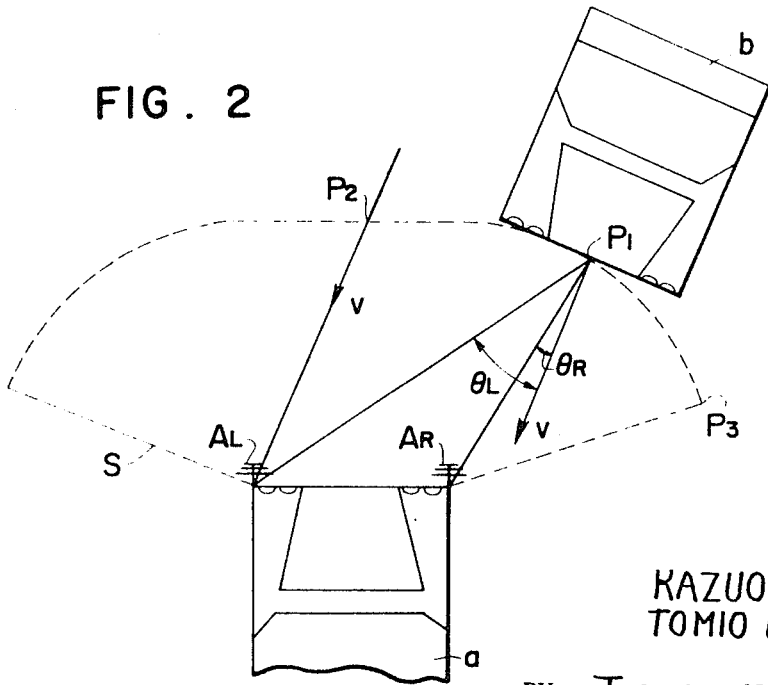

FIG. 2 illustrates a case where the vehicle $b$ is approaching the vehicle $a$ from forward sideways at the relative velocity $v$. The direction of the relative velocity $v$ is indicated by the arrow. Characters $\theta_L$ and $\theta_R$ indicate the angles formed by the travel directions of the wave signals radiated from the antennas $A_L$ and $A_R$ and the direction of the relative velocity $v$. The equivalent reflection point is indicated by $P_1$. If the points $P_2$ and $P_3$ are taken as the critical points for crash in the region S, the value $V_R/V_L = \cos \theta_R/\cos \theta_L$ is gradually increased as the point $P_1$ moves from the point $P_2$ toward the point $P_3$ in the same manner as in the case of FIG. 1. Therefore, the range of the quotient $V_R/V_L$ in the crash region can be determined. When the quotient $V_R/V_L$ deviates from that range, it indicates in advance that no collision will occur.

FIG. 3 illustrates a case where a transmitting antenna and receiving antennas are separately provided. A transmitting antenna $A_c$ is installed in the front portion of the vehicle $a$ at the center thereof. Two receiving antennas $A_l$ and $A_r$ are installed in both corners of the front portion. The angles made by the travelling direction of the radiated wave signal and the travelling direction of each of two reflected wave signals with respect to the equivalent reflection point $P_1$ and the direction of the relative velocity $v$ are indicated by $\theta_c$, $\theta_l$ and $\theta_r$, respectively. The frequencies $f_{dr}$ and $f_{dl}$ of the Doppler signals obtained by the receiving antennas are expressed as follows.

$$f_{dr} \approx v(\cos \theta_c + \cos \theta_r)/C \cdot f_t \quad (6)$$

$$f_{dl} \approx v(\cos \theta_c + \cos \theta_l)/C \cdot f_t \quad (7)$$

The quotient of two quantities of electricity $V_r$ and $V_l$ proportional to these frequencies are expressed as follows.

$$V_r/V_l = \cos \theta_c + \cos \theta_r/\cos \theta_c + \cos \theta_l \quad (8)$$

In this case, too, the quotient $V_r/V_l$ is gradually increased as the equivalent reflection point $P_1$ moves from the crash critical point $P_2$ to the point $P_3$, and therefore it is possible to set the range of the quotient $V_r/V_l$ in the crash region.

According to this invention, two antennas have appropriate directivities so as to provide a semi-circular object detecting region. When a part of the body of an on-coming vehicle comes within said region, the Doppler signal frequencies are obtained from the frequencies of the reflected wave signals received by said antennas. Thus, occurrence of a vehicle crash is detected from the ratio of quantities of electricity proportional to said frequencies of the Doppler signals. At this time, the approaching direction of the on-coming vehicle is also detected from the two quantities of electricity. That is, when $V_r/V_l$ is smaller than 1, the oncoming vehicle is approaching from the left-hand side of a vehicle. If $V_r/V_l$ is larger than 1, the oncoming vehicle is approaching from the right-hand side.

FIG. 4 is a block diagram of an embodiment of a collision sensing device employing ultrashort wave which is built for carrying out the principles of the collision sensing system of this invention. The reference numeral 1 identifies an ultrashort wave generator. The ultrashort waves radiated from two antennas 2a and 2b are reflected from an on-coming vehicle as described above and are received by said antennas. The radiated wave and the reflected wave are mixed and are subjected to homodyne detection by detectors 3a and 3b, thereby to obtain Doppler signals. Two Doppler signals are respectively amplified by amplifiers 4a and 4b. After that, said signals are passed to frequency-voltage converters 5a and 5b, where they are converted to voltages proportional to the frequencies of the Doppler signals. For example, the converter 5a generates a voltage $V_R$ and the converter 5b generates a voltage $V_L$. The two voltages $V_R$ and $V_L$ are divided by a divider 7 to obtain the quotient $V_R/V_L$. The reference numeral 10 designates a comparator, which applies an output A to an "and" circuit 13 only when the input voltage $V_R/V_L$ is in a certain set range. Namely, it is detected by the existence of the output A that two vehicles are in the crash region.

In the device of FIG. 4, two voltages $V_R$ and $V_L$ are further passed to an adder 8. The sum of these two voltages are applied to a blind zone circuit 11. When the sum of two voltages $V_R$ and $V_L$ exceeds a certain value in the circuit 11, an output B is developed. As the sum of two voltages is proportional to the relative velocity $v$ between vehicles, the output B detects whether the relative velocity in the event of a crash is the critical velocity or not.

Rectifiers 6a and 6b rectify the Doppler signals amplified by the amplifiers 4a and 4b and develop the voltages proportional to the levels thereof. These voltages are added by an adder 9 and are passed to a blind zone circuit 12. When the sum of these voltages exceeds a certain value, an output C is obtained. Since the level of the Doppler signal is inversely proportional to the relative distance between vehicles, the generation of the output C means that the relative distance comes within a certain set value. Thus, the time allowance until a crash is determined.

When all outputs A, B and C are applied to the "and" circuit 13, the output of the circuit 13 actuates an operation circuit 14. The operation circuit 14 actuates a passenger protecting device such as air bag or the like. Therefore, whether or not the approach direction of two vehicles is in the crash region is determined by the output A. Whether or not the relative velocity in the event of a crash exceeds the critical velocity is determined by the output B. The time allowance for the actuation of a protecting device is determined by the output C. The protecting device is put into operation only when the above-described conditions are all satisfied.

According to the collision sensing system of this invention, a protecting device is operated in advance only when two vehicles are sure to crash. The protecting device is not operated when two vehicles pass each other and therefore an actual crash does not take place. Consequently, erroneous operation of the protecting device is eliminated. Furthermore, the time allowance for the operation of a passenger protecting device can be taken well in advance by observing the relative velocity and relative distance, and the protecting device is put into operation only when the relative velocity exceeds the critical velocity.

In the above-described embodiment, the detection of a head-on collision is performed by providing two antennas in the front portion of a vehicle. If an antenna is provided on the lateral side or in the rear of a vehicle, it is possible to detect a sideway collision or rear-end collision in advance.

What is claimed is:

1. A collision sensing system for a vehicle, comprising signalling means mounted on the vehicle for transmitting undulatory signals from the vehicle and receiving the undulatory signals reflected from an object in the path of the transmitted signals, said signalling means including a pair of sensing means located at two separate horizontally spaced points on the vehicle for sensing the reflected signals, receiver means coupled to said sensing means for producing two electrical quantities, one of the electrical quantities being proportional to the difference frequency between the frequency of the transmitted undulatory signals and the frequency sensed by one of the sensing means, the one of the electrical quantities thereby representing the relative speed between the one of said sensing means and the object, the other of said quantities being proportional to the frequency difference between the transmitted undulatory signals and the frequency received at the other of said sensing means, the other of the quantities thereby representing the relative speed between the other of said sensing means and the object, and comparator means for detecting the ratio of the two electrical quantities as a measure of the difference between the speeds at which the sensing means and the object move relative to each other.

2. A system as in claim 1, wherein said sensing means are each directional and oriented for receiving undulatory signals reflected from an object whose line of direction between the vehicle and the object has a component directed ahead of the vehicle.

3. A system as in claim 1, wherein said sensing means are mounted on the front of the vehicle and have directional sensing capabilities pointed substantially ahead and partly to the side of the vehicle.

4. A system as in claim 1, wherein said receiver means includes a pair of receiving circuits, each of said receiving circuits forming one of the two electrical quantities.

5. A system as in claim 1, wherein the vehicle is formed to define a direction of forward motion, and wherein said sensing means and said points are located along a line substantially transverse to the direction of forward motion.

6. A system as in claim 1, wherein the vehicle is formed to define a direction of forward motion and wherein said signalling means transmits the undulatory signal substantially ahead and partly to the sides of the vehicle.

7. A system as in claim 1, wherein said signalling means includes signal-radiating means separate from said sensing means.

8. A system as in claim 1, wherein said sensing means each includes signal-radiating means.

9. A system as in claim 1, wherein said detecting means includes comparator means for producing an indication when the ratio of the two electrical quantities lies within a predetermined range.

10. A system as in claim 1, wherein said detecting means includes comparator means for producing an indication when the ratio of the two electrical quantities lies in a predetermined range and circuit means for producing a second indication when the sum of the two quantities exceeds a predetermined value.

11. A system as in claim 1, wherein said detecting means includes comparator means for producing a first indication when the ratio of the two electrical quantities lies in a predetermined range and level responsive means coupled to said sensing means for adding the level of the signals sensed by each of said sensing means and for producing a second indication when the sum of the levels exceeds a predetermined value.

12. A system as in claim 1, wherein said detecting means includes comparator means responsive to said detecting means for producing an indication when the ratio of the two electrical quantities lies in a predetermined range, wherein said detecting means includes circuit means responsive to said receiver means for producing an indication when the sum of the two quantities exceeds a predetermined value, wherein said detecting means includes level responsive means coupled to said sensing means for sensing the combined level sensed by sensing means and for producing an indication when the sum of the levels exceeds a predetermined value, and wherein said detecting means includes combining means responsive to said comparator means and said circuit means and said level responsive means for producing an operating signal in response to simultaneous occurrence of said indications.

13. A system as in claim 12, further comprising safety actuating means responsive to the output of said combining means for actuating safety equipment in the vehicle.

14. A system as in claim 5, wherein said detecting means includes comparator means for producing an indication when the ratio of the two electrical quantities lies within a predetermined range.

15. A system as in claim 6, wherein said detecting means includes comparator means for producing an indication when the ratio of the two electrical quantities lies in a predetermined range and circuit means for producing a second indication when the sum of the two quantities exceeds a predetermined value.

16. A system as in claim 5, wherein said detecting means includes comparator means for producing a first indication when the ratio of the two electrical quantities lies in a predetermined range and level responsive means coupled to said sensing means for adding the level of the signals sensed by each of said sensing means and for producing a second indication when the sum of the levels exceeds a predetermined value.

17. A system as in claim 5, wherein said detecting means includes comparator means responsive to said detecting means for producing an indication when the ratio of the two electrical quantities lies in a predetermined range, wherein said detecting means includes circuit means responsive to said receiver means for producing an indication when the sum of the two quantities exceeds a predetermined value, wherein said detecting means includes level responsive means coupled to said sensing means for sensing the combined level sensed by said sensing means and for producing an indication when the sum of the levels exceeds a predetermined value, and wherein said detecting means includes combining means responsive to said comparator means and said circuit means and said level responsive means for producing an operating signal in response to simultaneous occurrence of said indications.

18. A system as in claim 8, wherein said detecting means includes comparator means responsive to said detecting means for producing an indication when the ratio of the two electrical quantities lies in a predetermined range, wherein said detecting means includes circuit means responsive to said receiver means for producing an indication when the sum of the two quantities exceeds a predetermined value, wherein said detecting means includes level responsive means coupled to said sensing means for sensing the combined level sensed by said sensing means and for producing an indication when the sum of the levels exceeds a predetermined value, and wherein said detecting means includes combining means respondive to said comparator means and said circuit means and said level responsive means for producing an operating signal in response to simultaneous occurrence of said indications.

* * * * *